United States Patent [19]

Mizusawa et al.

[11] Patent Number: 4,820,215
[45] Date of Patent: Apr. 11, 1989

[54] FUEL SUPPLYING SYSTEM FOR OUTBOARD MOTOR

[75] Inventors: Norihito Mizusawa; Yoshihiro Gohara; Yoshikazu Nakayasu, all of Hamamatsu, Japan

[73] Assignee: Sanshin Kogyo Kabushiki Kaisha, Hamamatsu, Japan

[21] Appl. No.: 186,760

[22] Filed: Apr. 26, 1988

Related U.S. Application Data

[63] Continuation of Ser. No. 901,192, Aug. 28, 1986, abandoned.

[30] Foreign Application Priority Data

Aug. 29, 1985 [JP] Japan .................................. 60-188463

[51] Int. Cl.⁴ ............................................. F16K 17/36
[52] U.S. Cl. ........................................ 440/88; 440/900
[58] Field of Search ................... 440/1, 88, 53, 57, 61; 137/38; 123/198 D, 198 DB; 180/282, 284

[56] References Cited

U.S. PATENT DOCUMENTS

| | | | |
|---|---|---|---|
| 3,134,561 | 5/1964 | Clejan | 244/58 |
| 4,269,213 | 5/1981 | Sasaki | 137/38 |
| 4,392,507 | 7/1983 | Harris | 137/38 |
| 4,493,659 | 1/1985 | Iwashita | 440/61 |

FOREIGN PATENT DOCUMENTS

56-38209  9/1981  Japan .

OTHER PUBLICATIONS

Johnson Owner's Manual for 55HP Super Seahorse, 1969.

Primary Examiner—Joseph F. Peters, Jr.
Assistant Examiner—Edwin L. Swinehart
Attorney, Agent, or Firm—Ernest A. Beutler

[57] ABSTRACT

Several embodiments of outboard motor fuel feed systems wherein a position responsive valve is interposed between a remotely positioned fuel tank and the engine charge former for precluding the inadvertent flow of fuel to the charge former when the outboard motor is tilted up. In one embodiment, the valve is a gravity responsive valve and in another embodiment, the valve is mechanically operated. In a third embodiment, a device is provided for relieving the pressure in the conduit between the position responsive valve and the fuel tank when the outboard motor is again tilted down to its normal running position.

15 Claims, 4 Drawing Sheets

FUEL SUPPLYING SYSTEM FOR OUTBOARD MOTOR

This is a continuation of U.S. patent application Ser. No. 901,192, filed Aug. 28, 1986, now abandoned.

BACKGROUND OF THE INVENTION

This invention relates to a fuel supplying system for an outboard motor and more particularly to an improved system for preventing the flow of fuel to the charge former of an outboard motor when the outboard motor is tilted up and an improved valve for precluding such flow.

Outboard motors are conventionally mounted for tilting movement about a horizontally disposed tilt axis from a normal running condition to a tilted up condition. When the motor is in its tilted up condition, it is important to insure that fuel is not delivered to the engine charge former since the outboard motor will not be running under this condition. If fuel is supplied to the charge former when the outboard motor is tilted up and the engine is not running, fuel spillage and attendant problems can result. These problems are particularly acute when the fuel is supplied to the outboard motor from a remotely positioned fuel tank. If the fuel tank and its connecting conduit are left connected when the motor is tilted up, the heating of the volume of fuel in the fuel tank can pressurize the lines feeding the charge former and fuel can be delivered to the charge former through this pressure. In addition, such lines normally include bulb type priming pumps and there is always the possibility that the pump may be accidentally depressed when the motor is tilted up, for example, by stepping on the pump.

It is, therefore, a principal object of this invention to provide an improved fuel supplying system for an outboard motor.

It is a further object of this invention to provide an arrangement for insuring against the delivery of fuel to an outboard motor charge former when the outboard motor is in a tilted up condition.

It is yet another object of this invention to provide an arrangement for preventing the flow of fuel from a remotely positioned tank to the charge former of an outboard motor when the outboard motor is tilted up.

One way in which the flow of fuel to the charge former of an outboard motor from its fuel tank can be precluded when the outboard motor is tilted up is by employing a gravity responsive type of check valve in the conduit connecting the fuel tank to the charge former. However, if such a check valve is employed, the pressurization which may occur in the line when the outboard motor is tilted up will continue when the outboard motor is tilted back down to its normal running condition and it may be impossible to delivery fuel to the engine for normal running.

It is, therefore, a further object of this invention to provide an improved valve for precluding the flow of fuel to an outboard motor when it is tilted up.

It is another object of this invention to provide an improved valve for preventing the flow of fuel to an outboard motor when it is tilted up and for insuring flow of the fuel to the motor upon its being tilted back down to its normal running condition.

SUMMARY OF THE INVENTION

A first feature of this invention is adapted to be embodied in a fuel supply system for an outboard motor having a charge former and supported for pivotal movement about a generally horizontal extending tilt axis between a normal running position and a tilted up position. A remote fuel tank is adapted to be carried in the hull of an associated watercraft and conduit means extend from the fuel tank to the charge former for delivering fuel thereto. Pumping means are also provided for pumping fuel through the conduit means. In accordance with this feature of the invention, position responsive valve means are provided for precluding flow to the charge former when the outboard motor is in its tilted up position.

A further feature of this invention is adapted to be embodied in a fuel supply system for an outboard motor having a charge former and which outboard motor is supported for pivotal movement about a generally horizontally extending tilt axis between a normal running position and a tilted up position. A fuel tank is incorporated and conduit means extend from the fuel tank to the charge former for delivering fuel to the charge former. In accordance with this feature of the invention, position responsive valve means are provided for precluding flow to the charge former when the outboard motor is in its tilted up position and for permitting flow to the charge former when the outboard motor is tilted down. The position responsive valve means is operated by a mechanical linkage system for moving the valve means between its positions in response to pivotal movement of the outboard motor.

Another feature of this invention is adapted to be embodied in a fuel supply system for an outboard motor haing a charge former, a fuel tank and conduit means interconnecting the fuel tank with the charge former. The outboard motor is supported for pivotal movement about a generally horizontally extending tilt axis between a normal running position and a tilted up position. In accordance with this feature of the invention, valve means are provided for precluding flow through the conduit means to the charge former in response to movement of the outboard motor to its tilted up position. This valve means further includes means for relieving the pressure in the conduit means upon tilting of the outboard motor back to its normal running position.

BRIEF DESCRIPTION OF THE DRAWINGS

FIG. 7 shows the condition in the tilted down position.

FIG. 8 shows the condition with the outboard motor tilted up.

FIG. 9 shows the outboard motor returned to the normal running condition.

DETAILED DESCRIPTION OF THE PREFERRED EMBODIMENTS

EMBODIMENT OF FIGS. 1 THROUGH 3

Figure 1:
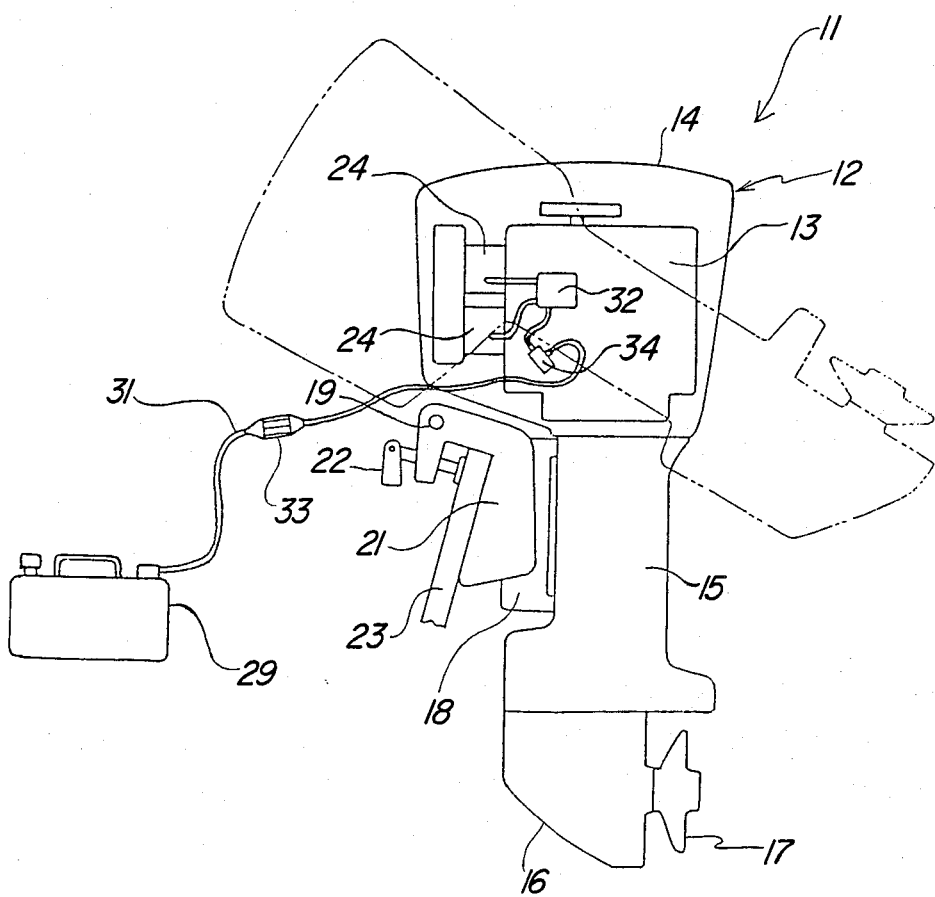
FIG. 1 is a side elevational view of an outboard motor constructed in accordance with a first embodiment of the invention.

An outboard motor constructed in accordance with a first embodiment of the invention is identified generally by the reference numeral 11. The outboard motor 11 includes a power head, indicated generally by the reference numeral 12, which includes an internal combustion engine 13 and a surrounding protective cowling 14. A drive shaft housing 15 depends from the power head 12 and contains a drive shaft (not shown) that is driven by the engine output shaft in a known manner. A lower unit 16 is formed at the lower end of the drive shaft housing 15 and contains a forward, neutral, reverse transmission for driving a propeller 17 from the engine driven drive shaft in a known manner.

A steering shaft (not shown) is affixed to the drive shaft housing 15 and is journaled in a swivel bracket 18 for steering of the outboard motor 11 about a generally vertically extending steering axis. The swivel bracket 18 is, in turn, pivotally connected by means of a pivot pin 19 to a clamping bracket 21 for tilting movement of the outboard motor 11 between a normal running position, as shown in solid lines in the figures, and a tilted up condition, as shown in phantom lines. The clamping bracket 21 carries an appropriate clamping device 22 for attachment to a transom 23 of an associated watercraft.

The engine 13, which is depicted as being of the two-cycle, crankcase compression type, is provided with a charge forming device in the form of a pair of carburetors 24. The carburetors 24 have float bowls 25 (FIG. 2) to which fuel is delivered by means of a needle valve 26 that is operated by a float 27 to provide a uniform head of fuel in the fuel bowl 25. The fuel is discharged into the induction system of the engine through a main fuel discharge 28. Since the construction of the carburetors 24 and engine 13 forms no part of the invention, these components will not be described in any further detail and any of the well known types of engines and charge formers may be employed.

A remotely positioned fuel tank 29 is adapted to be carried in the hull of the associated watercraft at a point spaced from the outboard motor 11 and specifically from the charge formers 24. A conduit 31 is provided for delivering fuel from the fuel tank 29 to an engine driven fuel pump 32 for delivery to the carburetors 24. A bulb type priming pump 33 is provided in the conduit 31 for priming purposes.

Figure 2:
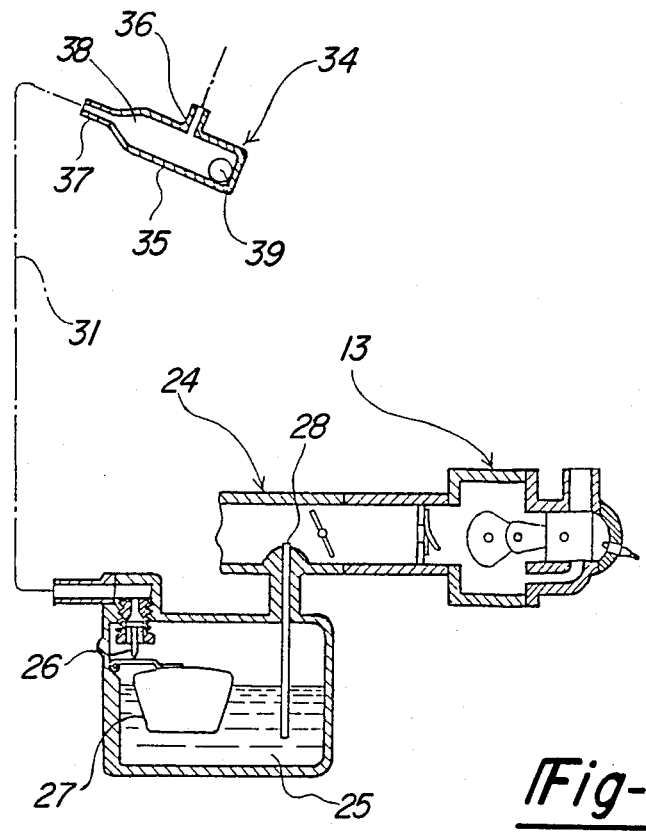
FIG. 2 is a partially schematic cross-sectional view showing the charge former and fuel supply system of the embodiment of FIG. 1, when the outboard motor is in its normal running condition.
Figure 3:
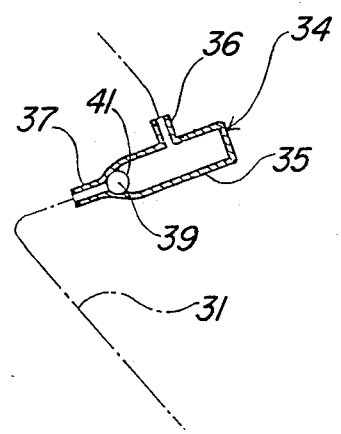
FIG. 3 is a partial view, in part similar to FIG. 2, showing the condition when the outboard motor is tilted up.

It should be readily apparent that when the motor 11 is tilted up, it is desirable to insure against the passage of fuel from the fuel tank 29 to the carburetors 24. Such fuel delivery would be possible either by heating of the fuel in the tank 29 causing expansion and pressurization of the conduit 31 or through inadvertent operation of the priming pump 33, as by stepping upon it. A position responsive valve, indicated generally by the reference numeral 34 and shown in most in most detail in FIGS. 2 and 3 is provided in this embodiment for preventing such fuel flow. The position responsive valve 34 includes an outer housing 35 that has an inlet fitting 36 and a discharge fitting 37 which communicate an internal cavity 38 with the conduit 31 for flow therethrough. A ball type valve 39 is loosely received within the cavity 38 and is normally held by gravity in a spaced position from the inlet fitting 36 and outlet fitting 37 when the outboard motor 11 is in its normal running condition (FIG. 2).

When the outboard motor 11 is tilted up, the ball 39 will fall by gravity into a tapered end 41 of the chamber 38 and block the flow through the discharge conduit 37. Hence, if there is any pressurization of the fuel in the tank 29 or activation of the pump 33, the fuel cannot flow into the carburetors 24 and specifically their fuel bowls 25. Thus, fuel spillage is prevented. When the outboard motor 11 is tilted back down, the ball 39 will return by gravity to the position shown in FIG. 2 and the resumption of fuel flow is possible.

EMBODIMENT OF FIGS. 4 THROUGH 6

A position responsive valve constructed in accordance with a second embodiment of this invention is identified generally by the reference numeral 61. Aside from the difference in the construction and operation of the valve 61, the basic configuration of the outboard motor and fuel tank of this embodiment is the same as the previously described embodiment and, for that reason, common components have been identified by the same reference numerals and will not be described again in detail.

The valve 61 includes a valve body 62 that is mounted on the swivel bracket 18. The body 62 has an inlet fitting 63 and an outlet fitting 64. The fittings 63 and 64 are in communication with the conduit 31 and intersect a bore in the valve body 62 in which a valve element 65 is journaled. The valve element 65 has an extending end to which a lever 66 is affixed. The lever 66 is, in turn, connected to one end of a link 67. The other end of the link 67 is pivotally connected to the clamping bracket 21.

Figure 5:
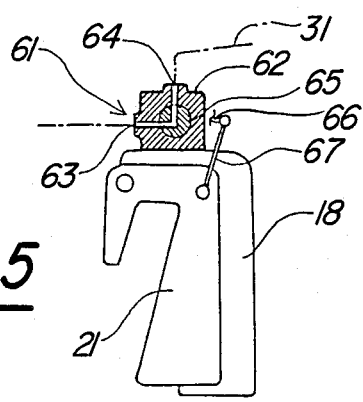
FIG. 5 is a cross sectional view showing the fuel shut-off valve of this embodiment in the tilted down condition.

The geometry of the linkages 66 and 67 and the relationship of the valve body 62 is such that the valve element 65 will be in a position wherein flow is permitted between the inlet fitting 63 and the outlet fitting 64 when the outboard motor is in its normal running position (FIG. 5). However, when the outboard motor 11 is tilted up, the links 66 and 67 will effect relative rotation of the valve element 65 relative to the valve housing 62 and close off communication of the inlet fitting 63 with the outlet fitting 64. Hence, inadvertent flow of fuel from the fuel tank 29 to the carburetors 24 will be precluded. When the outboard motor is tilted down again, the valve 61 will again open and permit free fuel flow.

Figure 4:
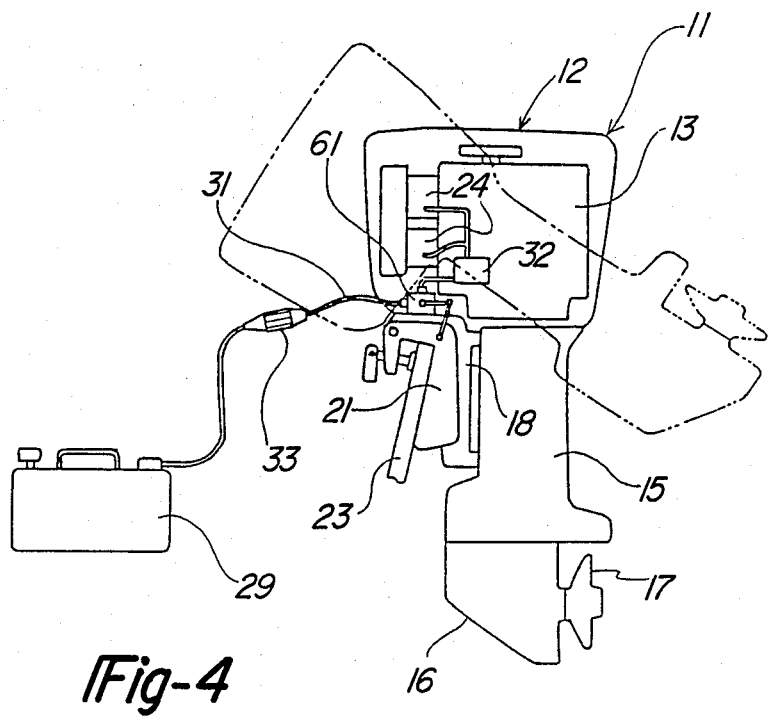
FIG. 4 is a side elevational view, in part similar to FIG. 1, showing a second embodiment of this invention.
Figure 6:
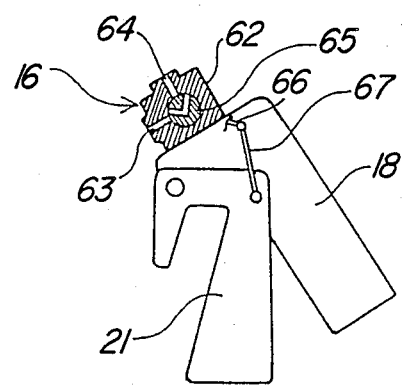
FIG. 6 is a cross-sectional view, in part similar to FIG. 5, showing the fuel shut-off valve in the tilted up condition.
Figure 7:
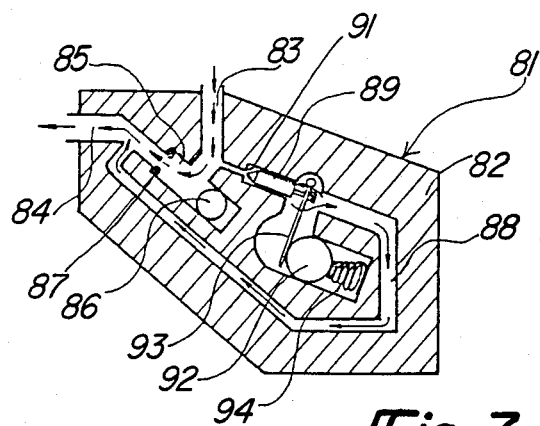
FIGS. 7, 8 and 9 are cross-sectional views on an enlarged scale of a fuel shut-off valve constructed in accordance with a third embodiment of the invention.
Figure 8:
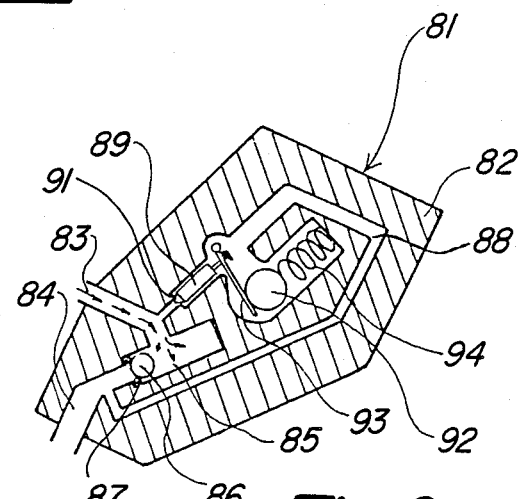

In the embodiment of FIGS. 1 through 3, if the fuel in the conduit 31 becomes pressurized, this fuel pressure will act on the ball valve 39 and might tend to retain it in a closed position. This is not possible with the embodiment of FIGS. 4 through 6 since the valve is positively moved between its opened and closed positions by the linkage system.

EMBODIMENT OF FIGS. 7 THROUGH 9

In this embodiment, like the embodiments of FIGS. 1 through 3 and FIGS. 4 through 6, differs from conventional outboard motor practice only in the construction and operation of the fuel shut-off valve. For this reason, only the fuel shut-off valve per se is shown in this embodiment and is identified generally by the reference numeral 81. This embodiment operates like the embodiment of FIGS. 1 through 3 in that the fuel shut-off valve 81 is gravity operated. However, this valve differs from the embodiment of FIGS. 1 through 3 in that it incorporates an arrangement for relieving pressure buildup in the fuel conduit when the outboard motor is returned to its normal running condition.

The valve 81 includes a valve body 82 that is adapted to be mounted at an appropriate location in the power head of the outboard motor and which has an inlet fitting 83 and an outlet fitting 84. The inlet and outlet fittings 83 and 84 are placed in communication with the conduit 31 in any appropriate manner.

The inlet and outlet fittings 83 and 84 intersect a main valve cavity 85 in which a ball type check valve 86 is positioned. An O-ring type valve seat 87 is received within the cavity 85 at the point where it is intersected by the discharge passage 84. The ball type check valve 86 cooperates with the valve seat 87 for controlling the flow from the cavity 85 to the discharge passage 84.

A pressure relief passage 88 is formed in the valve body 82 between the inlet passage 83 ad discharge passage 84 and around the cavity 85. A needle valve 89 is supported in a portion of the pressure relief passage 88 and cooperates with a valve seat 91 for controlling the flow through this pressure relief passage 88.

In addition to being operated by its own weight, the needle valve 89 is further acted on by means of a ball weight 92 that bears against a lever 93 that is supported within the valve body 82 and which cooperates with a stem of the needle valve 89 for positioning it. A light coil compression spring 94 also acts upon the ball 92.

This embodiment works as follows. When the outboard motor is in its tilted down condition, the ball 86 moves away from the seat 87 and opens the flow through the cavity 85. At the same time, the weight of the ball 92 overcomes the action of the spring 94 and this coupled with the weight of the lever 93 and the needle valve 89 opens the pressure relief passageway 88 so that fuel can flow from the inlet 83 to the outlet 84 both through the cavity 85 and through the pressure relief passage 88.

If the outboard motor is tilted up, the ball valve 86 moves against the seat 87 and the needle valve 89 moves against the seat 91 so as to close communication of the inlet passage 83 with the outlet fitting 84. Hence, any pressure in the fuel line will not effect flow to the carburetor. However, it should be noted that the buildup of pressure in the line will cause the cavity 85 to be pressurized and hence a pressure will be existent on the ball valve 86 that tends to hold it in a closed position. This pressure, on the other hand, will act on the needle valve 89 and tend to cause it to open. However, the weight of the ball 92 and action of the spring 94 is sufficient to hold the needle valve 89 closed when the outboard motor is tilted up.

Figure 9:
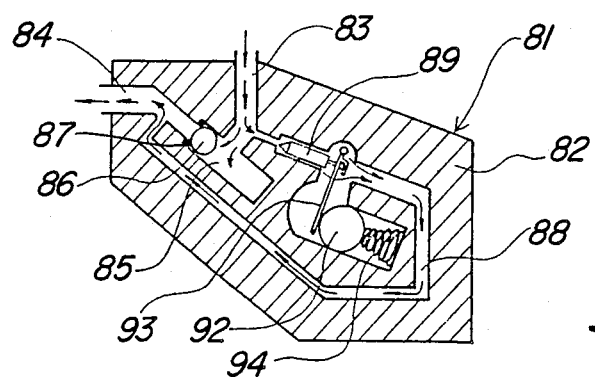

When the outboard motor is again tilted down to its normal running condition, any pressure in the line may tend to hold the ball valve 86 closed. However, as has been noted, this pressure tends to open the needle valve 89 and when the outboard motor is tilted down, the needle valve 89 is no longer acted upon by the spring 94 and ball 92 since these elements return by gravity to their position shown in FIG. 9. Hence, fuel may flow through the pressure relief passage 88 to the carburetor and reduce the pressure acting on the ball 86 sufficiently to cause it to open.

It should be readily apparent from the foregoing description that a number of embodiments of the invention have been illustrated and described and each of which operate in a highly effective manner so as to prevent inadverent fuel discharge when an outboard motor is tilted up. Although a number of embodiments have been illustrated and described, various other changes and modifications may be made without departing from the spirit and scope of the invention, as defined by the appended claims.

We claim:

1. In a fuel supply system for an outboard motor having a charge former and an engine driven fuel pump for delivering fuel to said charge former, said outboard motor being supported for pivotal movement about a generally horizontally extending tilt axis between a normal running position and a tilted up position, a remote fuel tank adapted to be carried in the hull of an associated watrcraft, conduit means extending from said fuel tank to said fuel pump for delivering fuel thereto, and manually operated priming pumping means external of said outboard motor for pumping fuel through said conduit means, the improvement comprising position responsive valve means in said conduit means for precluding flow to said engine driven fuel pump and said charge former when said outboard motor is in its tilted up position and if said manually operated priming pump is operated.

2. In a fuel supply system as set forth in claim 1 wherein the position responsive valve means is carried by the power head of the outboard motor.

3. In a fuel supply system as set forth in claim 1 wherein the position responsive valve means includes a a gravity operated member.

4. In a fuel supply system as set forth in claim 1 wherein the position responsive valve means comprises a valve operated by a mechanical linkage system for moving said valve beween its positions in response to pivotal movement of the outboard motor.

5. In a fuel supply system as set forth in claim 4 wherein the linkage system includes a link pivotally connected at one of its ends to a clamping bracket of the outboard motor and having an operative connection at its other end to said valve.

6. In a fuel supply system as set forth in claim 5 wherein the other connection of the end of the link comprises a pivotal connection to a lever arm that is connected to a valve element of the valve means supported within a valve body of the valve means that is affixed to the swivel bracket of the outboard motor.

7. In a fuel supply system as set forth in claim 1 wherein the charge former comprises at least one carburetor having a fuel bowl and a float operated valve for controlling the level of fuel in said fuel bowl.

8. In a fuel supply system for an outboard motor having a charge former and supported for pivotal movement about a generally horizontally extending tilt axis btween a normal running position and a tilted up position, a remote fuel tank adapted to be carried in the hull of an associated watercraft, conduit means extending from said fuel tank to said charge former for delivering fuel thereto, and manually operated priming pumping means external of said outboard motor for pumping fuel through said conduit means, the improvement comprising position responsive valve means for precluding flow to said charge former when said outboard motor is in its tilted up position and if said manually operated priming pump is operated, and means for providing bypass flow past said position responsive valve means.

9. In a fuel supply system for an outboard motor having a charge former and supported for pivotal movement about a generally horizontally extending tilt axis between a normal running position and a tilted up position, a remote fuel tank adapted to be carried in the hull of an associated watercraft, conduit means extending from said fuel tank to said charge former for delivering fuel thereto, and pumping means for pumping fuel through said conduit means, the improvement comprising position responsive valve means for precluding flow to said charge former when said outboard motor is in its tilted up position, and means for relieving the pressure in said conduit means between the fuel tank and the position responsive valve means upon tilting down of the outboard motor from its tilted up position to its normal running position.

10. In a fuel supply system as set forth in claim 9 wherein the means for relieving pressure comprises a second position responsive valve means that is biased by the fuel pressure to an opened position.

11. In a fuel supply system for an outboard motor having a charge former and supported for pivotal movement about a generally horizontally extending tilt axis between a normal running position and a tilted up position, and conduit means extending from said fuel tank to said charge former for delivering fuel thereto, the improvement comprising position responsive valve means for precluding flow to said charge former when said outboard motor is in its tilted up position and for permitting flow to said charge former when said outboard motor is tilted down, said responsive valve means being operated by a mechanical linkage system for moving the valve means between its positions in response to pivotal movement of said outboard motor.

12. In a fuel supply system as set forth in claim 10 wherein the linkage system includes a link pivotally connected at one of its ends to a clamping bracket of the outboard motor and at its other end to the valve means.

13. In a fuel supply system as set forth in claim 12 wherein the connection of the other end of the link comprises a pivotal connection to a lever arm that is connected to a valve element of the valve means supported within a valve body of the valve means that is affixed to the swivel bracket of the outboard motor.

14. In a fuel supply system for an outboard motor having a charge former and supported for pivotal movement about a generally horizontally extending tilt axis between a normal running position and a tilted up position, a fuel tank, conduit means extending from said fuel tank to said charge former for delivering fuel thereto, and position responsive valve means for precluding flow to said charge former from said fuel tank when said outboard motor is in its tilted up position, the improvement comprising pressure relieving means for relieving the pressure in the conduit between the position responsive valve means and the fuel tank in response to tilting down movement of the outboard motor.

15. In a fuel supply system as set forth in claim 14 wherein the means for relieving pressure comprises a second position responsive valve means that is biased by the fuel pressure to an opened position.

* * * * *

UNITED STATES PATENT AND TRADEMARK OFFICE
CERTIFICATE OF CORRECTION

PATENT NO. : 4,820,215
DATED : April 11, 1989
INVENTOR(S) : Mizusawa, et al

It is certified that error appears in the above-identified patent and that said Letters Patent is hereby corrected as shown below:

Column 2, line 6, "horizontal" should be —horizontally—.

Column 2, line 37, "haing" should be —having—.

Column 5, line 25, "ad" should be —and—.

Column 6, line 21, Claim 1, "watrcraft" should be —watercraft—.

Column 6, line 36, Claim 3, delete "a".

Column 6, line 48, Claim 6, after "the" insert —connection of the—.

Column 6, line 48, Claim 6, delete "connection of the".

Column 6, line 60, Claim 8, "btween" should be —between—.

Column 8, line 5, Claim 12, "10" should be —11—.

Signed and Sealed this

Twenty-second Day of October, 1991

*Attest:*

HARRY F. MANBECK, JR.

*Attesting Officer*  *Commissioner of Patents and Trademarks*